United States Patent Office 3,519,282
Patented July 7, 1970

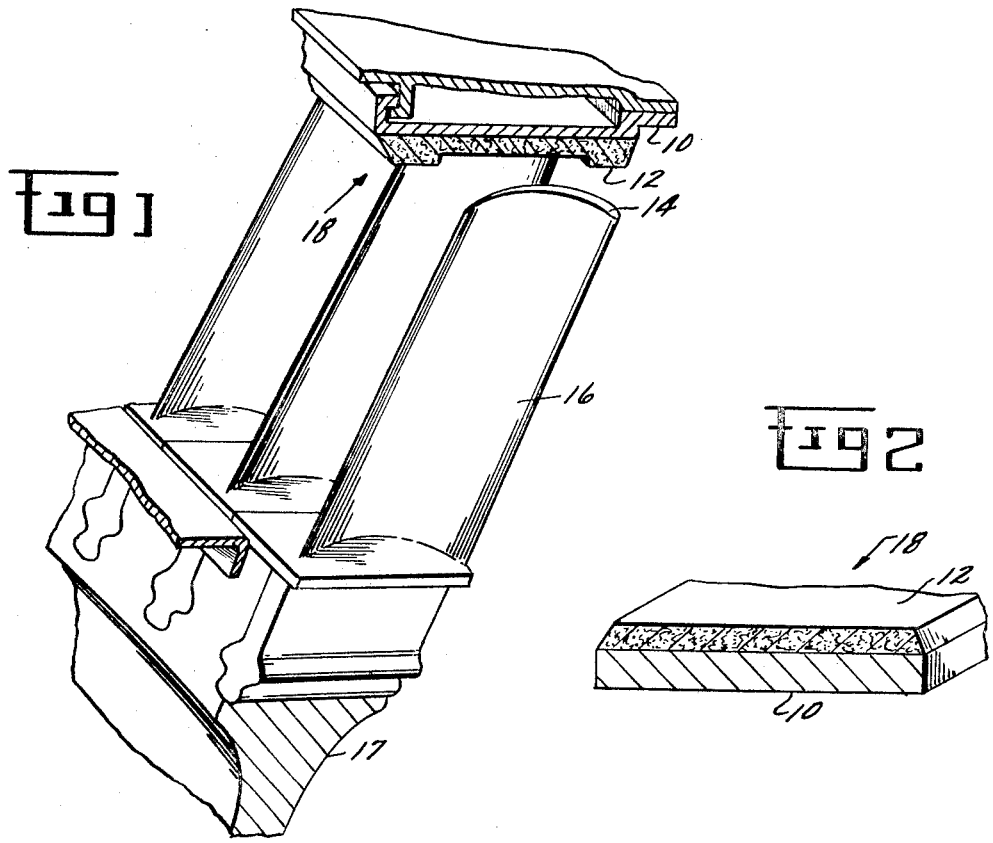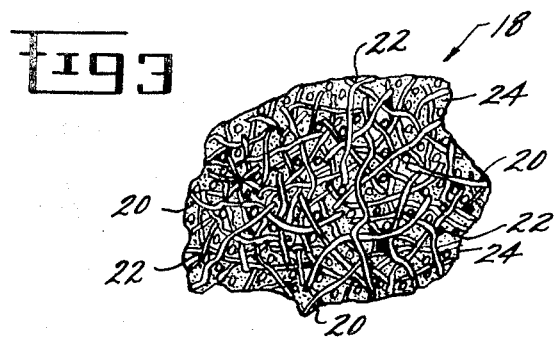

3,519,282
ABRADABLE MATERIAL SEAL
David R. Davis, Cincinnati, Ohio, assignor to General Electric Company, a corporation of New York
Filed Mar. 11, 1966, Ser. No. 533,636
Int. Cl. F16j 15/16
U.S. Cl. 277—230            3 Claims

ABSTRACT OF THE DISCLOSURE

The disclosure shows a tip seal for a bladed turbomachinery rotor. The seal comprises a circumferential member formed by a matrix of randomly oriented, structural metallic fibers bonded together and forming a porous structure. Granular metallic material fills the voids in the porous structure. The granular material is bonded to itself and to the structure to form a lightweight friable sealing member.

---

The present invention relates to abradable materials and, more particularly, to relatively high operating temperature abradable materials as applied to sealing members.

The invention is concerned with new and improved materials particularly useful as sealing surfaces between relative moving parts of turbomachinery such as compressors and turbines and also having good properties as thermal insulators, and damping and sound deadening materials as well as having good structural erosion and oxidation properties.

While the matrix described herein is primarily for use in sealing movable parts in high temperature jet engines, it may have other uses in the fields noted above. It will be described as a seal in connection with gas turbine compressors such as those of the axial flow type having a rotor with a plurality of circumferentially disposed radially extending blades, and a casing surrounding the rotor having an inner surface closely spaced from the free ends of the rotor blades.

It is well known that the efficiency of the gas turbine engine is dependent in part upon the dimensional tolerances that are maintained during the production of the engine assembly. A particularly difficult dimensional tolerance to maintain is concerned with the peripheral seal between the free ends of the rotor blades and the surrounding casing. The use of abradable sealing materials as a lining for the casings is well known in the art. Such materials have been used to avoid damage due to the rubbing contact of the rotor blades with the compressor casing and further, to effect the necessary seal between the moving parts.

Many materials and compositions have been proposed for such sealing structure. A common one is the well known honeycomb or filled honeycomb such as shown in U.S. Pat. 3,053,694 which shows a yielding cellular construction, such as a honeycomb assembly adapted to occupy the space between the rotor blades and the compressor casing wall and act as a sealing means between the moving parts. The use of the filler to fill the honeycomb assembly is also disclosed.

Generally, in the high Mach engines currently in design, the materials and methods heretofore employed are not completely satisfactory. For example, current honeycombs which are rugged enough to withstand fatigue, erosion and oxidation, due to the temperature and flow, wear down the bucket tips severely because of the rubbing of the bucket tips on the honeycomb. Because of the need for long life and high oxidation resistance to the high temperature gases, a filler material in the honeycomb rugged enough to withstand these conditions presents too much resistance and damages or wears the buckets more than desired. Unfilled honeycomb has performance losses. It has become apparent that the thin sheet metal compressor casings proposed for the new high Mach engines are difficult to manufacture within the concentricity tolerances necessary for adequate sealing without the use of an abradable coating or lining on the compressor casing walls. Accordingly, it is evident that an abradable material capable of functioning at high temperatures is necessary as well as one that has good adhesion to a backing material and remains stable or unaffected over a wide temperature range. At the same time, it must be capable of being easily repaired or patched after engine operation and capable of being easily ground away or removed by rubbing of the bucket tips on the material. Furthermore, the material must be able to pass through the engine after being abraded without affecting the operation.

The primary object of the invention is to provide a filled matrix material which meets all of these requirements.

Another object is to provide a new and improved abradable seal material which is strong and lightweight, abradable, and oxidation and erosion resistant for use in high Mach engines.

A further object is to provide such a material which is usable as seal material between relatively movable parts.

Briefly stated, the invention provides a filled matrix of randomly oriented structural metallic fibers that are contact-bonded or sintered together to form a porous structure. Before bonding, it is similar to the well known steel wool except that the metallic fibers are short and randomly oriented as opposed to the long wire wound type found in steel wool. Into this porous structure, there is disposed at least one granular metallic material filling the voids. The granules in the metallic material are bonded to each other and to the fibers to form a lightweight, friable structure. The invention proposes a granular metallic material of nickel, copper or a combination of the two in a powder form. Additionally, the invention is directed to a sealing structure employing such a filled matrix.

While the specification concludes with claims particularly pointing out and distinctly claiming the subject matter which is regarded as the invention, it is believed the invention will be better understood from the following description taken in connection with the accompanying drawing, in which:

FIG. 1 is a fragmentary perspective sectional view of a section of an engine employing the present invention;

FIG. 2 is a perspective sectional view of a structure of the present invention; and FIG. 3 is a diagrammatic cross-sectional view greatly enlarged illustrating the matrix of the invention.

Referring first to FIG. 1, there is illustrated a compressor casing 10 provided with a layer or interior lining of the improved abradable matrix material 12 which can be machined or rubbed by the tip 14 of the compressor blade 16 to establish a minimum working clearance between the blade tip and the opposing material for good sealing. Of course, any rubbing seal application, such as labyrinth seals may operate in the same manner.

The detailed structure as shown in FIG. 2 is preferably metallic. A variety of metal fills may be used depending upon the specific requirements of a particular installation. For example, a variety of mixtures of copper powder and nickel powder have been used successfully. For application temperatures in the range of about 1600° F. or above nickel powder alone is used because of oxidation problems with copper powder. However, at lower temperatures, mixtures of nickel and copper ranging from 20-100% copper with the balance nickel powder. The thickness of the metal forming the matrix 18 may vary within a wide range as is conventional honeycomb assemblies in such applications. Generally, it is desirable to maintain the thickness of the matrix wall at a minimum to inhibit blade tip wear. In a preferred embodiment, a matrix with a thickness of .1 to .2" has been used. It should be understood greater thicknesses may be successfully utilized depending on the application and the location of the material.

As shown in FIGS. 1 and 2, a backing material 10, such as the interior wall of the compressor casing section of an engine, is provided and attached thereto is a portion of the new and improved abradable material matrix 18 of the invention. In FIG. 1, compressor blade 16 is supported for rotation by conventional means on a rotor wheel 17 and is seen in operative position with the abradable material 12. During actual operation, the blade tip 14 wears or abrades the surface of material 12 away until at operating temperatures, when all of the components have expanded to their full size, a good seal is obtained.

In lieu of the conventional filled honeycomb, the matrix of the invention generally indicated at 18 is formed by provision of randomly oriented long structural metallic fibers as seen in FIG. 3. These fibers 20 may be described as a wire mesh that is made up of different lengths of long fibers such as shown in U.S. Pat. 3,127,668 and, while not required, generally substantially circular in cross-section. By long, it is meant that the individual fibers have a ratio of length to diameter of 5 to 1 and above. These fibers are compacted and FIG. 3 is a greatly enlarged view of a small portion of the fibers. As can be seen, the fibers are randomly oriented and cross one another in no fixed pattern or length. They may or may not be straight as shown for convenience. In order to provide cohesiveness, the fibers are sintered or bonded at their contact points 22 so that, with the fibers alone as described, a porous structure with voids is formed.

It will be apparent that the structure thus far described is extremely prone to oxidation because of the large exposed area. Additionally, it is not resistant to rubbing or erosion because of the very porous nature of the structure. To eliminate the oxidation defect and provide resistance to erosion and to form a rigid matrix for good sealing and high temperature applications the porous structure is filled as by augmenting with a granular metallic filling 24 preferably of a metallic powder. This granular metallic material of suitable size or sizes, fills the voids in the porous structure formed by the metallic fibers 20 as seen in FIG. 3.

In order to provide a composite and solid matrix, the granules are also sintered or bonded to each other and to the fibers to form a composite lightweight, friable structure. The bonding or sintering can be performed at the normal sintering temperatures for the powder or powders used so that the fibers and metallic granules are all bonded together simultaneously or the fibers may be formed and then filled and the granules then bonded to the fibers and to each other.

As compared to lattice honeycomb, both filled and unfilled, the structural differences will be apparent. Additionally, there are functional differences. For the same density, the filled matrix has a smaller dispersion of void cavities. This feature makes it possible for single particles of the metallic material fill to span between the fibers making the fill itself part of the structure and contributing to the strength of the matrix. Further, with respect to friability, under severe rubs, the fibers, because they have finite random lengths, can tear away as well as wear away making the matrix more easily abradable than the cellular honeycomb. The random oriented structural metallic fibers 20 in the compacted form as shown in FIG. 3 are known as a wire felt and the wire felt is filled with the sintered powder as described to form a solid matrix. It will be apparent that the granular metallic material 24 may completely fill or partially fill the voids in the porous structure and this filling improves the strength, oxidation, erosion, and wear characteristics as well as forming a rigid structure. The matrix is thus mechanical and metallurgical. It is mechanical in the sense that the granular metallic filler size and proportion makes up a geometric matrix which bridges support from the fiber "backbone" to the surface. It is metallurgical from the standpoint that inter particle bonding is obtained forming a solid unitary matrix. In turbomachinery shroud use, such a matrix forms a smooth shroud surface that is friable and results in good sealing and consequent significant performance gains.

In high temperature applications, as in the turbine shroud area, the granular metallic material may conveniently be a nickel powder. This is highly temperature resistant as well as forming a very strong but very friable matrix. In lower temperature applications, as in compressor shrouds, a less expensive filler such as copper powder may be used. This is not subject to the wiping of the extremely hot gases so is sufficiently strong to form a good friable seal. In middle-ground temperature applications or other applications such as insulating materials or damping materials, the metallic filling may comprise a mix in suitable proportions of copper and nickel powders. It will be apparent that other metallic material may be used but these specific metallic material have been found satisfactory for the uses indicated.

It should be understood that the particle size of the granular metallic material or powders used in the matrix described above can be varied within wide limits without departing from the true spirit and scope of the invention. It should also be understood that the invention is not limited to the specific embodiment noted but may be used in other ways and applications without departure from the spirit of the invention and scope of the appended claims.

I claim:
1. In a turbomachine comprising a bladed rotor and a surrounding casing;
    a seal between the outer portions of said rotor and said casing including,
    a circumferential sealing member formed by,
    a matrix of randomly oriented, long, structural metallic fibers bonded together and forming a porous structure, and
    granular metallic material filling the voids in the porous structure,
    said granular material being bonded to itself and to the fibers to form a lightweight, friable member.

2. A seal as described in claim 1 wherein said granular metallic material in the matrix is a nickel powder.

3. A seal as described in claim 1 wherein said granular metallic material in the matrix is a mix of copper and nickel powders.

References Cited

UNITED STATES PATENTS

| | | |
|---|---|---|
| 1,704,256 | 3/1929 | Lorenz. |
| 2,455,804 | 12/1948 | Ransley et al. _____ 117—22 |
| 2,930,521 | 3/1960 | Koehring. |
| 3,068,016 | 12/1962 | Dega _____ 277—96 |
| 3,278,279 | 10/1966 | Kraft et al. |
| 3,114,197 | 12/1963 | DuBois et al. |
| 3,199,836 | 8/1965 | Moyer _____ 253—77 |
| 3,310,387 | 3/1967 | Sump et al. _____ 29—182 X |
| 3,350,178 | 10/1967 | Miller _____ 29—182 X |

(Other references on following page)

FOREIGN PATENTS

| | | |
|---|---|---|
| 821,690 | 10/1959 | Great Britain. |
| 836,730 | 6/1960 | Great Britain. |
| 838,853 | 6/1960 | Great Britain. |

OTHER REFERENCES

Materials and Methods, November 1955, A. G. Metcalfe, pp. 96–98.

Product Engineering, May 30, 1960, M. Sabanas, pp. 57–61.

LAVERNE D. GEIGER, Primary Examiner

J. S. MEDNICK, Assistant Examiner

U.S. Cl. X.R.

117—22, 95; 253—77; 277—53, 96, 236, 237